United States Patent

Manfredi

[15] 3,640,254
[45] Feb. 8, 1972

[54] SYSTEM FOR REDUCING AND CONTROLLING EXHAUST EMISSIONS FROM INTERNAL COMBUSTION ENGINES

[72] Inventor: Frank A. Manfredi, 2026 W. 95th St., Cleveland, Ohio 44102

[22] Filed: Feb. 5, 1970

[21] Appl. No.: 9,018

[52] U.S. Cl..................123/119 CF, 123/25 B, 123/119 CA
[51] Int. Cl......................................................F02m 25/00
[58] Field of Search...............123/25 A, 25 J, 25 G, 119 CA, 123/119 C, 119 CF

[56] References Cited

UNITED STATES PATENTS

| | | | |
|---|---|---|---|
| 2,702,535 | 2/1955 | Links | 123/119 C |
| 3,322,105 | 5/1967 | McIntyre | 123/122 F |
| 2,889,819 | 6/1959 | Lockheed | 123/25 |
| 3,528,225 | 9/1970 | Manfredi | 123/25 |

Primary Examiner—Mark M. Newman
Assistant Examiner—Warren Olsen
Attorney—Cushman, Darby & Cushman

[57] ABSTRACT

A system is described for reducing and controlling certain undesired byproducts from a combustion process in an engine by forcing supplemental air, preferably preheated, into the intake manifold of the engine at a point downstream from a conventional carburetor device. In addition, liquid vapor may be introduced into the intake manifold at approximately the same point. Preferably, a blower means for delivering supplemental air and a pumping means for pumping liquid are both operated by a single variable speed electric motor so that the functions of both devices can be related to changes in engine demands during operation.

20 Claims, 10 Drawing Figures

INVENTOR
FRANK A. MANFREDI

BY Cushman, Darby & Cushman
ATTORNEYS

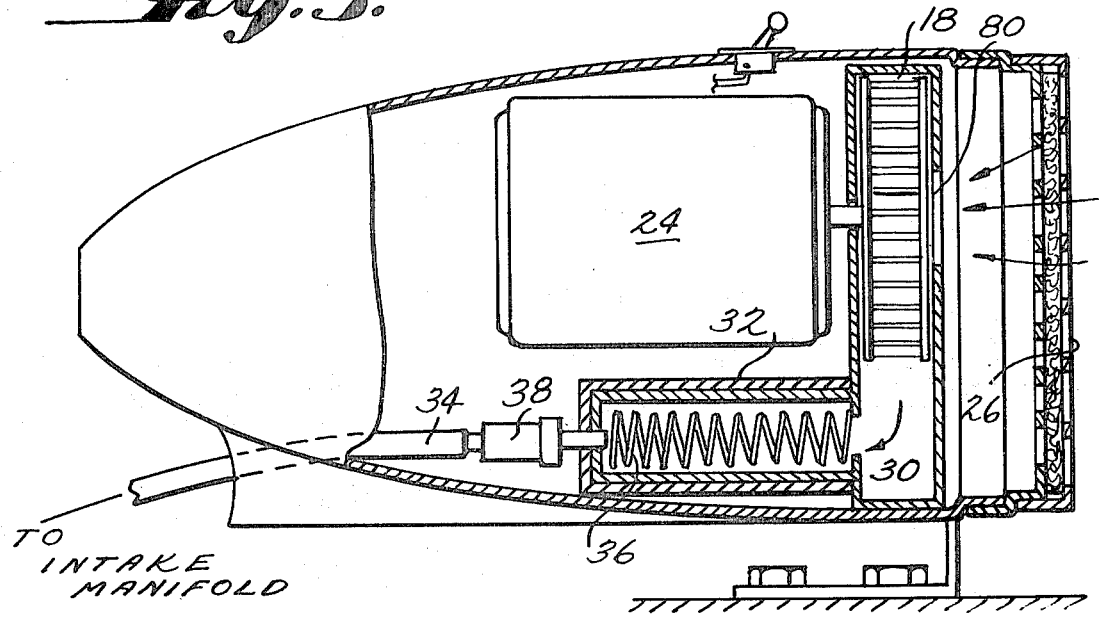
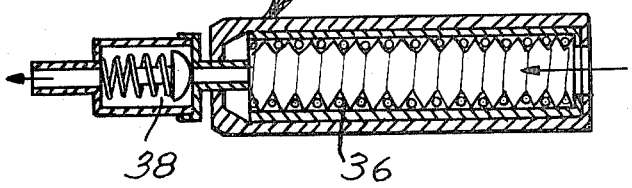
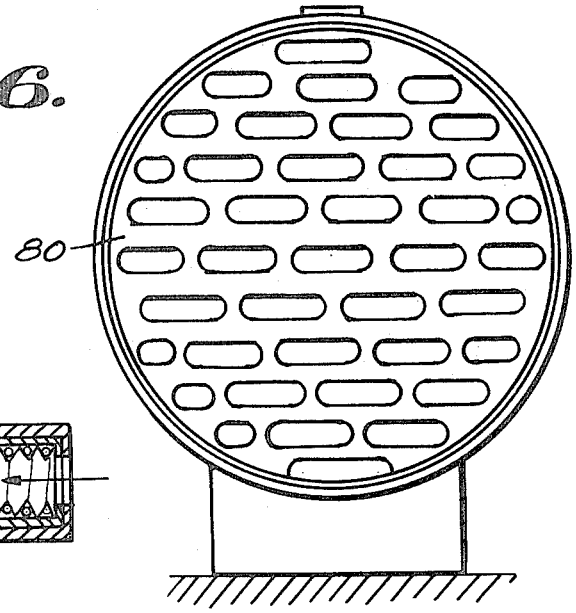

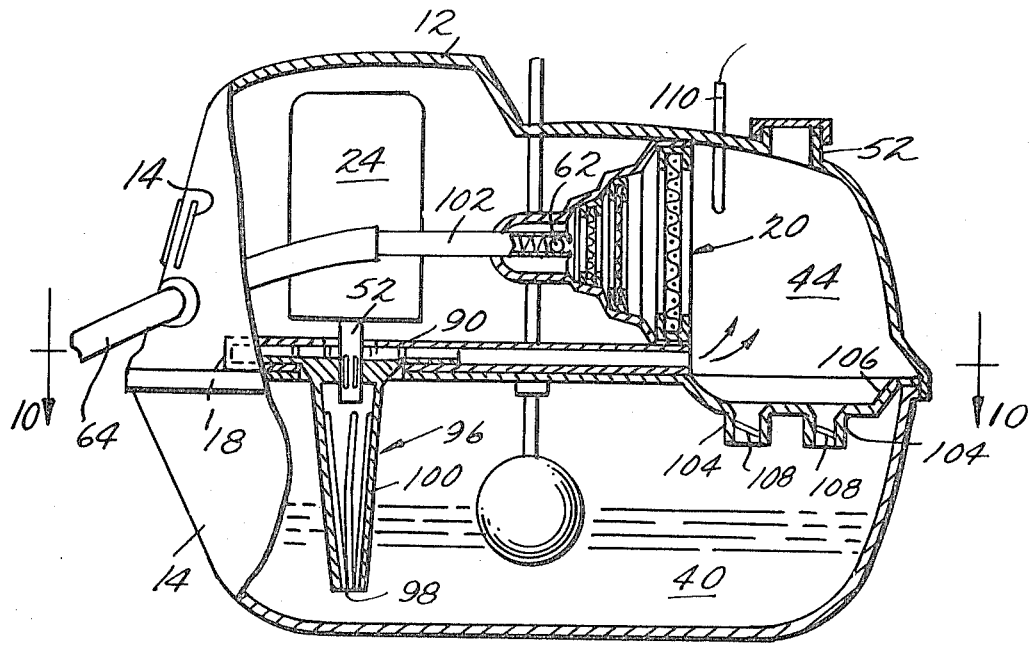
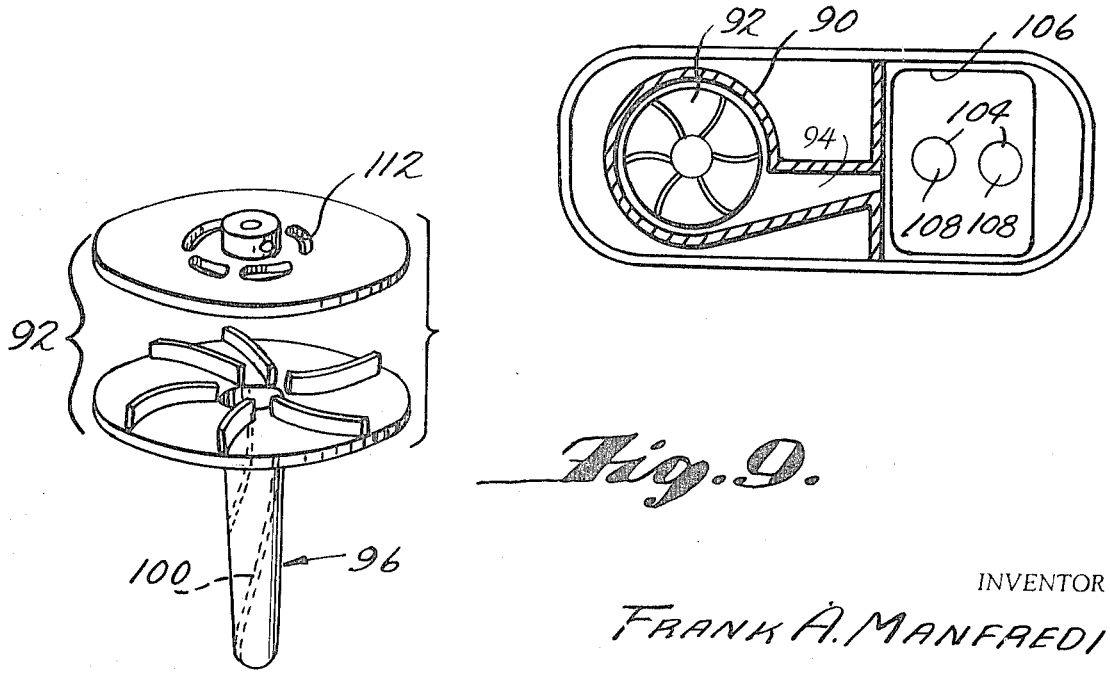

3,640,254

SYSTEM FOR REDUCING AND CONTROLLING EXHAUST EMISSIONS FROM INTERNAL COMBUSTION ENGINES

BACKGROUND AND BRIEF DESCRIPTION OF INVENTION

This invention relates to systems for improving combustion in internal combustion engines so as to reduce amounts of carbon monoxide, hydrocarbon byproducts, and other pollutants that may be emitted into the atmosphere by such engines. More particularly, the invention relates to an improved system for reducing pollutants and for improving engine performance by the addition of controlled quantities of compressed air into the intake manifold of the engine and by a preferable simultaneous introduction of liquid vapor into the intake manifold.

As is well known at the present time, exhaust emission control for internal combustion engines represents a serious concern. Federal legislation has attempted to curtail atmospheric pollution by setting certain limits for components found as combustion byproducts in engine exhausts. For example, present standards require that carbon monoxide exist in no greater amount than 1½ percent in the exhaust from an automobile engine, and that undesirable hydrocarbon byproducts be limited to no more than 0.0275 percent. In order to meet these standards, certain accessory devices have been added to conventional internal combustion engines to assist in complete combustion of fuel in the engines. These accessory devices have considered such things as positive crank case ventilation, distributor adjustments at certain r.p.m.s of the engine, the pumping of air into exhaust ports, and a preheating of air received into a carburetor during cold weather operation or starting of an engine. The system which will be described for the present invention is completely compatible with all present day accessory devices intended to improve combustion performance of internal combustion engines, but more importantly, the system of this invention provides for a further and substantial reduction in percentage of carbon monoxide and other pollutants in exhaust emissions of engines that already have been modified and tuned in accordance with present day standards. The system which will be described in this specification can be economically manufactured and easily installed on existing engines with no significant modification of the engine or its conventional accessory equipment. Further, the system of this invention can be utilized with existing engines without taxing engine performance in any noticeable or serious amount.

It is known in this art to provide for various supercharger and blower devices as accessories to internal combustion engines for assisting in the drawing of air into the combustion cylinders during operation of the engine. Generally, such devices have been concerned with improving horsepower and certain performance factors of engines at relatively high r.p.m.s where conventional air delivery systems cannot keep up with the demands of the engine. Known devices intended for such performance improvements are not noted for economical operation or particular reduction or control of undesired byproducts of combustion. In addition, it is known to introduce moisture into the fuel/air delivery system of an internal combustion engine in various ways, and my own copending application, Ser. No. 601,502, now U.S. Pat. No. 3,528,225 filed Dec. 7, 1966 describes such a vapor injecting system.

In contrast with prior art arrangements and devices, the system of the present invention is primarily concerned with improving engine performance and combustion to reduce undesired exhaust emissions. This is done not by merely forcing or ramming a quantity of air through the carburetion and fuel delivery system of an engine, but rather, by utilizing a relatively simple blower device to move supplemental air into the intake manifold of an engine at a point downstream from the conventional carburetion device associated with the engine. Preferably, the blower device used in connection with this invention is of a type which can be driven by a small electric motor from a 6- or 12-volt source with no more consumption of electrical power than would be experienced with a typical blower fan for a heating system in present day automobiles. The advantage of such a blower device is that it does not tax the output of the engine in a serious way by requiring a driving connection to the crank or other power output of the engine, and when set up in accordance with the present invention to introduce the supplemental volume of air at a preferred point downstream from the carburetor, it is possible to use a relatively low performance blower unlike many that have been attempted in the past. In addition, the system of the present invention provides for a controlled addition of liquid vapor into the intake manifold simultaneously with the introduction of supplemental air, and this arrangement provides for an even greater reduction in exhaust emission pollutants.

These and other features and advantages of the present invention will become apparent in the more detailed discussion which follows. In the detailed discussion, reference will be made to the accompanying drawings as briefly described below.

BRIEF DESCRIPTION OF DRAWINGS

FIG. 5 is an elevational view, partly in section, of an embodiment of the invention which does not include provision for vapor injecting;

FIG. 6 is a front elevational view of the device shown in FIG. 5;

FIG. 7 is an enlarged detailed sectional view of a heating means associated with the outlet conduit from the blower of the device of FIG. 5;

FIG. 8 is a view similar to FIG. 2, showing a somewhat modified version of the FIG. 2 unit;

FIG. 9 is an exploded perspective view of a combination water pumping and air-impelling device used with the arrangement shown in FIG. 8; and FIG. 10 is a view of the FIG. 8 type of unit, as seen generally along lines 10—10.

DETAILED DESCRIPTION OF INVENTION

Figure 1:
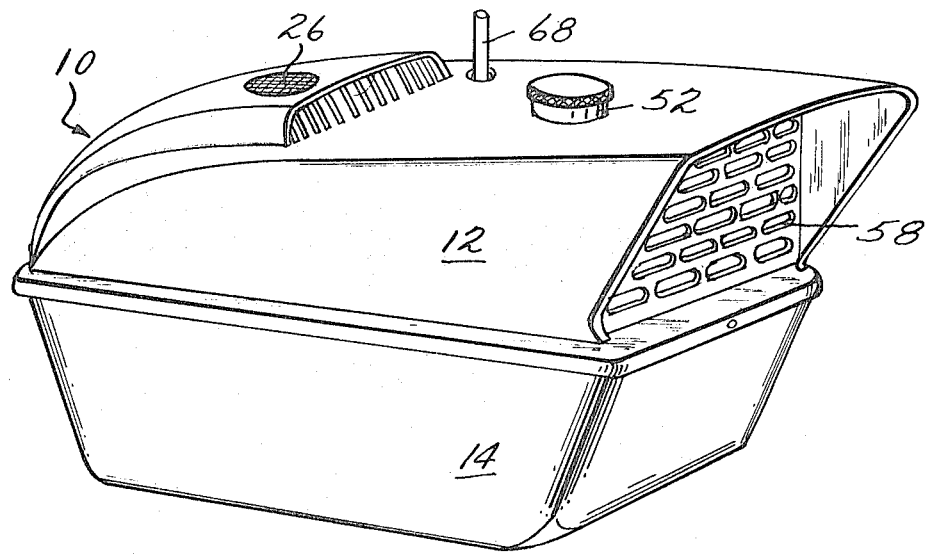
FIG. 1 is a perspective view of a form of housing structure designed to contain working components of an exhaust emission control system having both a blower means for introducing supplemental air and a vapor injecting means for introducing liquid vapor into the intake manifold of an internal combustion engine.
Figure 2:
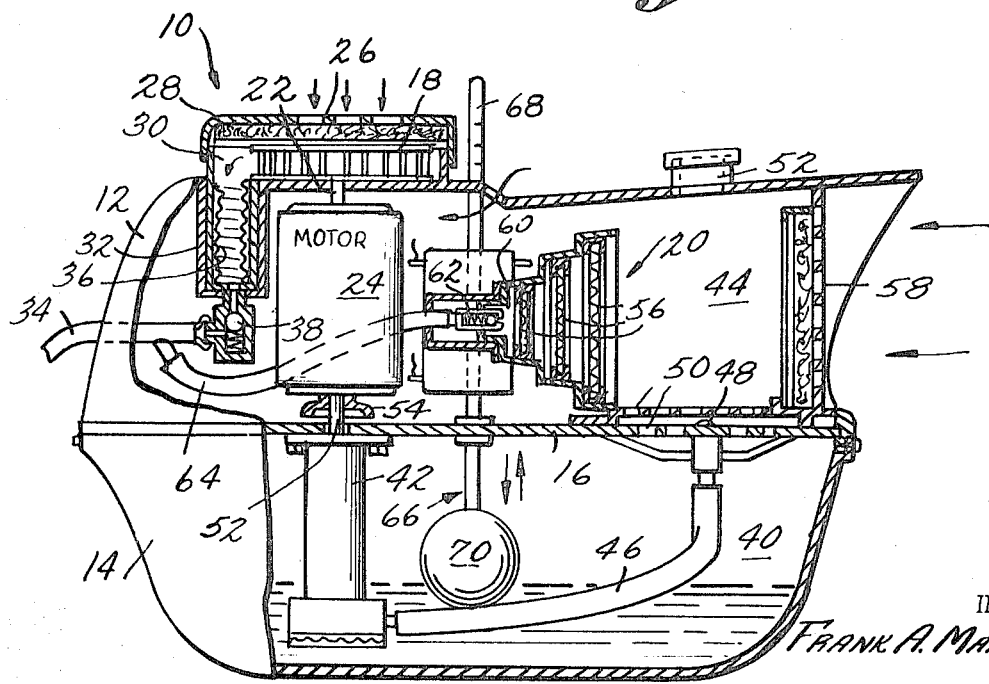
FIG. 2 is an elevational view partly in cross section of a system incorporating both a blower means and a vapor injecting means, although the housing illustrated in FIG. 2 is somewhat different in form from what is shown in FIG. 1.

Referring to FIGS. 1 and 2, the invention is illustrated in a preferred embodiment which provides for controlled addition of supplemental air to the intake manifold of an engine along with a controlled addition of moisture, or other liquid vapor, at approximately the same point of admission. FIG. 1 illustrates the compactness of such an embodiment for use with engines installed in conventional automobiles or other motor vehicles. FIG. 2 illustrates working components contained within a unit of the type illustrated in FIG. 1, although the housing structure shown in FIG. 2 is somewhat different from the design shown in FIG. 1.

The exhaust emission control system 10 which is shown in FIGS. 1 and 2 is contained within a housing that may be considered to be generally divided into an upper section 12 and a lower section 14. This permits the housing to be formed in two basic sections which can be easily assembled together by conventional fastening devices which secure overlapping portions of the upper and lower sections 12 and 14. As shown in FIG. 2, the upper section 12 carries a number of working components associated with the system, and the lower section 14 functions generally as a reservoir area for liquid which is pumped from the lower section into a vaporizing and mixing zone in the upper section. A splash plate element 16 is positioned between the upper and lower sections to confine stored liquid in the reservoir to the lower section 14 and to prevent damage to certain working components in the upper section from splashing that may occur in normal movements encountered in use of an automobile. In a sense, the splash plate element 16 may be considered as a sealing plate which extends completely across the unit and which includes only a sufficient number of openings to provide for passage of certain shafts and for introduction of liquid into the reservoir for refilling purposes.

In accordance with the invention, the illustrated exhaust emission control system 10 is provided with a blower means 18 for forcing supplemental air into the intake manifold of a conventional engine. In addition, the system 10 may optionally and preferably include a liquid vapor injecting means 20 of the type described in my copending application, Ser. No. 601,502. As shown in FIG. 2, the blower means 18 includes a relatively small centrifugal fan which can be carried on a shaft 22 and driven by a small electric motor 24. It is contemplated that the blower be of the type used in conventional heating systems for automobiles and driven by an electric motor 24 which operates on a 6- or 12-volt electrical supply from the electrical system of an automobile. With such an arrangement, there is no requirement for taxing the crankshaft output from the engine, and there is no need for a large Rootes-type blower or similar type of positive displacement supercharger. The blower fan is contained within a housing having an inlet 26 for receiving air from an area external to the unit 10. Air is received through an inlet 26 opening shown as being through the top of the unit, but an inlet could be provided through a vertical opening in the unit if desired. Air received into the inlet 26 passes through a filter 28 and then into a central portion of the fan of the blower 18. From there, the air is forced radially outwardly into an outlet means beginning at the chamber 30 in the blower housing. The outlet means will be defined, for purposes of describing and claiming this invention, as including the chamber 30, a downwardly extending conduit portion 32, and a conduit 34 which extends to the intake manifold of the engine for admitting compressed air into the intake manifold. Thus, air is forced from the blower 18 through the outlet means and into the intake manifold to provide a supplemental supply of air which is precompressed and which assists in a complete combustion of fuel and an improved performance of the engine. It is an important feature of the present invention that the supplemental quantity of air introduced by the blower means 18 be introduced downstream from the conventional carburetor associated with the fuel delivery system of the engine. Prior art systems, such as shown in U.S. Pat. No. 2,839,038, have emphasized the forcing of air through a carburetor itself, but the present invention is based, in part, upon the discovery that substantially improved combustion and performance can be achieved by introducing supplemental air downstream from the carburetor. It is believed that this arrangement is especially critical in present day engines which include exhaust emission control accessories and which require leaner air/fuel ratios for successful operation within the standards set by Federal legislation. In such engines, carburetor adjustment and tuning are more sensitive and critical than with engines having no exhaust emission accessories and controls, and the whole purpose of successful exhaust emission control and good performance would probably be defeated by an attempt to force air through the carburetor itself. Also, it is preferred that the charge of supplemental air be introduced into the engine at a point as close as is practical to the combustion chambers in the engine, although sufficient mixing with the carburetor charge should be provided.

Figure 4:
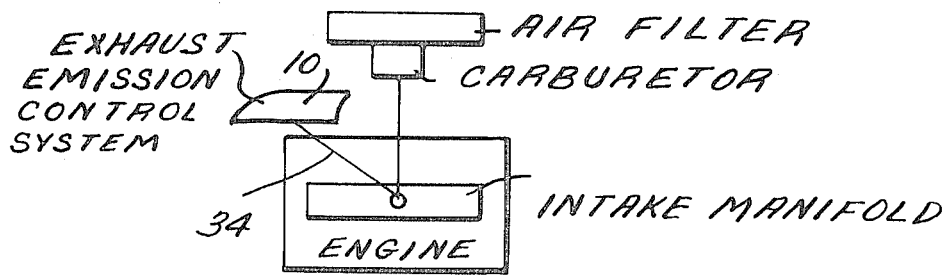
FIG. 4 is a diagrammatic view showing the relationship of the system of the present invention to existing accessory equipment associated with internal combustion engines.

FIG. 2 also illustrates the positioning of a heating means 36 for preheating the supplemental supply of air to the intake manifold of the engine. Preferably, the heating means is in the form of a heating wire encased around the inner cylindrical wall of the outlet portion 32 and heated by resistance to electrical current flow. Suitable circuiting and connections (not shown) are provided for operating the heating means 36 from the electrical system of the engine with which the unit is associated, and a switch may be provided for manually activating and deactivating the heating means, if desired. It is contemplated that the heating means 36 will function to assist in starting a cold engine or to improve performance in cold weather driving conditions, but it may be desired to use the heating means for substantially all driving conditions where it is desired to regulate the temperature of supplemental air introduced into the engine. Again, as with the introduction of supplemental air, it has been found that preheating of air can be carried out more favorably downstream from a critically adjusted carburetor than from upstream of the carburetor. Accordingly, it is preferred that the heating means 36 be combined in the same portion of the system which supplies a supplemental air charge to the intake manifold downstream from the carburetor position. FIG. 4 schematically illustrates the intended relationship of the exhaust emission system of the present invention to existing carburetor and fuel delivery systems for an internal combustion engine. The conduit 34 is of any suitable construction to be fitted into the intake manifold and to withstand usual manifold pressure changes. A one-way check valve means 38 is provided downstream from the blower 18 to prevent a backup of gases from the manifold into the blower. The check valve 38 may be in the form of a spring-loaded ball valve, as shown, or of any other suitable construction.

The system shown in FIG. 2 also includes a liquid vapor injecting means 20 for introducing controlled amounts of liquid vapor into a combustion charge for an internal combustion engine. The liquid which is introduced may be vaporized water, alcohol, or any of a number of chemical additives in forms of liquid solutions, mixtures, or suspensions which have characteristics of improving engine performance or of reducing or neutralizing exhaust pollutants. The vapor injecting means 20 is of the type described in my aforesaid U.S. patent application. This type of vapor injecting means includes a reservoir 40 for storing a quantity of liquid, a pumping means 42 for pumping the liquid from the reservoir into a spray chamber 44 by way of a conduit 46 and a spray nozzle 48. The spray chamber 44 is provided with an apertured bottom at 50 to permit addition of liquid into the reservoir through an inlet 52 and to allow drainage of excess liquid sprayed into the chamber. In the preferred arrangement the pumping means 42 is connected by a shaft 52 to the same electric motor 24 which operates the blower 18. The shaft 52 may comprise an extension of the shaft 22 which is connected to the blower. A flexible material splash guard 54 is provided at the base of the motor 24 to prevent any splashing of liquid up into the motor itself. However, liquid is generally confined to the reservoir area 40 by the splash plate element 16 as discussed above.

In accordance with the invention described in my application, Ser. No. 601,502, the vapor injecting means 20 includes foraminous members 56 for increasing exposure of liquid to an airstream moving through the vapor injecting means 20. Air is admitted into the vapor injecting means through a front opening 58, from where it travels through the spray chamber 44 and into a housing which contains the foraminous members 56. The foraminous members 56 may be formed from screens having mesh sizes in the range of 12 to 28 Tyler standard sieve mesh, but they may also be formed from other porous or foraminous materials. Each member 56 is disc shaped and fitted into the illustrated housing for mixing liquid vapor and air. The vapor mixture produced in the vapor injecting means is carried to an outlet end of the housing at 60 and creates a sufficient pressure to open a one-way check valve 62 so that the vapor-laden air can be carried to the intake manifold of the engine. A conduit 64 is provided for this purpose, and in the preferred arrangement, the conduit 64 communicates with the blower outlet conduit 34 so that the vapor charge can be admitted to the intake manifold along with the supplemental air charge from the blower.

Figure 3:
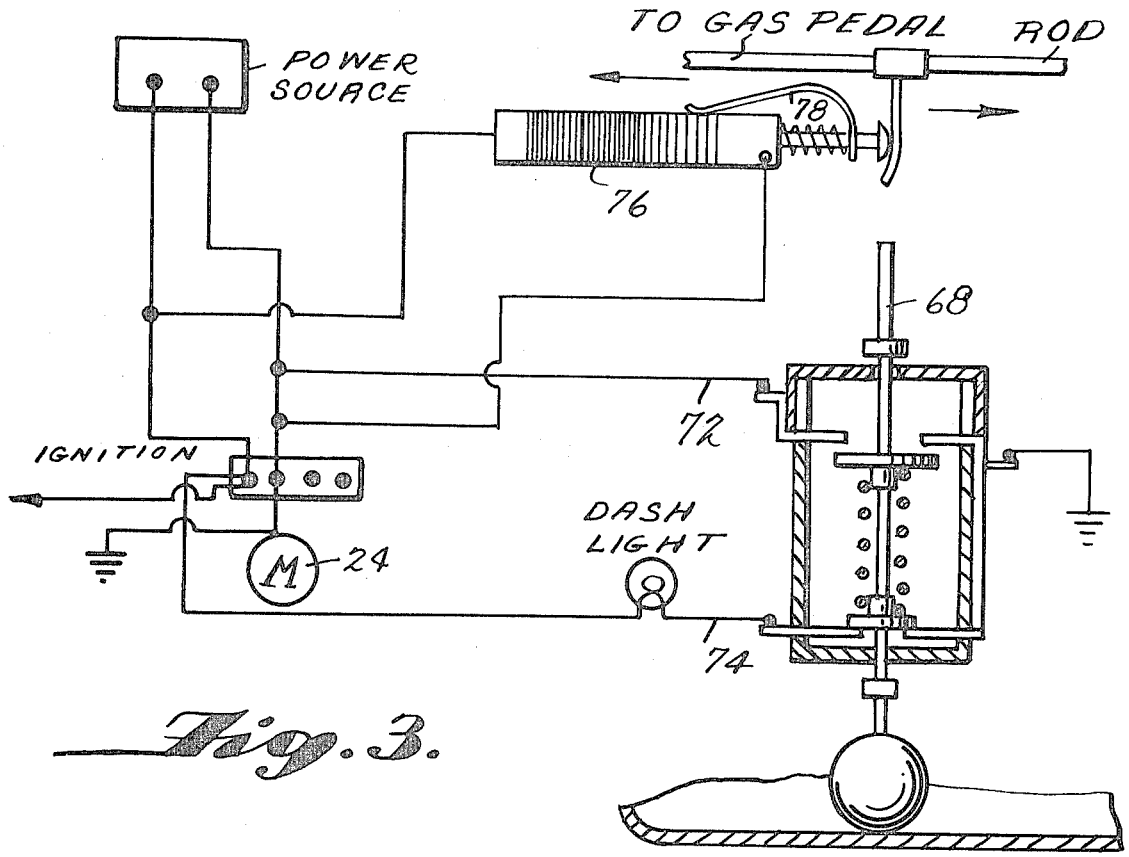
FIG. 3 is a schematic layout of components and circuiting associated with control features of the system of the present invention.

The vapor injecting part of the system may also include certain controls for sensing the level of the liquid in reservoir 40 and for determining the amount of moisture being added to the combustion charge. A float control means 66 is provided for indicating the level of liquid in reservoir 40. The float control means 66 may have an upwardly extending arm portion 68 which functions as a visual indicator for showing the level of liquid in the reservoir as viewed from outside of the unit when the automobile is being serviced. The arm 68 is secured to a float ball 70 and passes through a sealing gasket in the splash plate element 16 for vertical reciprocal movements relative to the splash plate element. The visual indicator arm 68 may also function to actuate a switching means associated with a control circuit for the vapor injecting means and the blower means. FIG. 3 illustrates a typical circuit which can be deactivated when the reservoir 40 is empty or when it reaches a prescribed low level. Downward movement of the indicator arm 68 results in an opening of a circuit line 72 to shut off the motor 24, thereby stopping the pumping means 42 and the blower means 18. At the same time, a circuit 74 is activated to operate an indicator light in the dashboard of the motor vehicle to show that the reservoir 40 requires refilling. FIG. 3 also illustrates a system for varying the speed of the electric motor 24 by means of a rheostat 76 which is adjusted by a contact arm 78. The contact arm 78 moves back and forth across the rheostat in accordance with movements of the throttle linkage of the automobile, although other engine performance factors may be utilized, if desired, to control the variable speed motor 24. Alternatively, the circuit can be set up to deactivate only the pumping means 42 when liquid in the reservoir drops to a low level. In addition, a humidistat may be included in the vapor injecting circuit to deactivate the vapor-injecting means when humidity exceeds a prescribed level.

In certain applications and in certain climatic conditions, it may be preferred to improve engine performance and to reduce exhaust emission pollutants by practicing this invention without the use of a vapor injecting means. FIGS. 5-7 illustrate an embodiment of the invention which provides for the addition of supplemental preheated air to the intake manifold of an engine without adding liquid vapor to the charge. In this embodiment, a simplified housing includes a variable speed motor 24 for driving a fan 18. Air is received through a front portion 26 of the housing and is channeled through a central opening 80 of the blower, as with the previously described embodiment. From there, air is moved through the same outlet means arrangement as discussed above for introduction into the intake manifold of the engine. A preheating means in the form of an electric heating coil 36 is provided in the outlet means of the blower arrangement, and a one-way check valve 38 is installed as indicated. FIG. 7 illustrates details of construction for the heating means included within a portion of the outlet means, and also details of the one-way check valve 38 are shown.

The arrangement which is shown in FIG. 8 is generally the same as that shown in FIG. 2, except that certain changes have been made in the means for introducing water vapor and compressed air into the system. As shown in FIG. 8, the electric motor means 24 is of a more conventional type which includes only a single output shaft 52. The blower means 18 is positioned beneath the motor 24 so as to be operatively connected to the downwardly directed output shaft 52. The blower means 18 includes a housing 90 which contains an impeller 92 for drawing air into the housing and impelling the air, in a compressed state, out of an outlet 94 communicating with the main blower housing. In this sense, the blower means 18 is of a well-known construction known to this art. An opening is provided at a top central portion of the housing 90 to permit entry of air into the impeller portion of the housing. The impeller 92 is secured to the output shaft 52 of the motor, and rotations of the output shaft will be imparted to the impeller in a well-known manner.

The unit of FIG. 8 also provides for a novel means for drawing water from the reservoir 40 and for transporting the water to the chamber 44. Instead of using a water pump 42, conduit 46 and spray valve 48, as required in the FIG. 2 embodiment, a pumping means 96 is operatively connected to the impeller 92 of the blower to draw water into the blower housing. The pumping means 96 is in the form of a hollow tapered tube extending downwardly into the reservoir 40 so as to receive water into its open end 98. Spiral or helical rib projections 100 are provided on an interior surface of the downwardly extending tube to impart a lifting action to any water which enters the lower end of the tube. The entire pumping tube 96 is secured to the output shaft 52, or to a rotating part of the blower means, so as to rotate with the impeller of the blower. FIG. 8 shows the pumping means 96 secured to the output shaft 52 of the motor, but FIG. 9 shows an alternative arrangement wherein the pumping means 96 is formed as a part of the blower impeller portion 92. In either case, water is drawn upwardly into the blower housing at the same time that air is being drawn into and compressed within the housing, and both water and compressed air are thrown out of the housing through the outlet passageway 94 which communicates with the mixing chamber 44. The mixing chamber 44 is designed as a substantially sealed unit so that no fluid compression is lost. This means that the front portion of the chamber must be closed, rather than open as in the FIG. 2 embodiment, and the liquid vapor injecting means 20 must be sealed around its top, bottom and sidewall portions where they contact interior surfaces of the upper part of the housing 12. Thus, compressed air and water can move into the chamber 44 by way of the passageway 94 when the combination blower and pumping means are rotating. From there, mixed water (or other liquid) and air vapors pass through the foraminous screens associated with the injecting means 20 in the same way as described for the FIG. 2 embodiment. A one-way check valve 62 is provided for allowing flow of vapor mixtures through conduit 102 only when pressure within the chamber 44 exceeds manifold pressure of the internal combustion engine with which the illustrated system is associated. It can be seen that both liquid and compressed air travel to the intake manifold of the engine by way of a single conduit 64 so that the mixture of air and liquid are simultaneously introduced at a preferred point in the intake manifold.

FIG. 8 also shows a somewhat modified splash plate 16 which is designed to prevent splashing of liquid from the reservoir 40 up into the chamber 44. The portion of the splash plate 16 which defines the bottom of the chamber 44 includes one or more downwardly extending tubes 104 for carrying liquid from a recessed area 106 of the splash plate down into the reservoir when the unit is being refilled by way of the fill pipe 52. Each of the tubes 104 includes a one-way valve 108 which is designed to allow passage of liquid downwardly into the reservoir but not upwardly into the mixing chamber 44. Each valve 108 may be in the form of a plastic disc fitted within the tubular configuration of its associated tubes 104, and each disc may be hinged at its rearward edge so that its forward edge can flap up and down, as needed. By hinging each valve rearwardly (with respect to intended line of travel of the vehicle), forward splashing and surging created by rapid stopping of the vehicle will cause the forward edges of the valve to move upwardly into positions for closing the tubes 104. This prevents splashing up into the mixing chamber 44. Also, the valves 108 function to maintain a sufficient seal within the chamber 44 to prevent a loss of substantial compression from that chamber when the system is being operated.

FIG. 8 also shows in a very schematic way the positioning of a humidistat 110 for detecting moisture content of vapor in the mixing chamber 44. A similar humidistat can be included in the system shown in FIGS. 1 and 2.

The combination impeller and water pumping means shown in FIG. 9 can be easily manufactured from known synthetic materials to be fitted in a housing 90 associated with the blower means 18. Upper and lower discs are secured together to complete the assembly of the illustrated unit. Openings 112 are provided in the upper disc for admitting air into the blower housing, and a central opening is provided in the lower disc for communicating with the hollow tube associated therewith so that water can move upwardly and into the impeller. Air enters the unit of FIG. 8 in any convenient way such as by a provision of openings 114 at the back (or at the top) of the unit. Sufficient air should be admitted to satisfy requirements of the blower impeller and to cool the motor 24.

As examples of improved performance achieved with the system of the present invention, tests have been conducted on a standard automobile engine of present day manufacture (with present day pollution control devices). A 1969 Chevrolet having 327 cubic inches of displacement and a two-barrel carburetor was used for test purposes. Tests were performed according to procedures outlined in the Federal Register, Volume 33, No. 108 part 2, June 4, 1968. The tests were carried out by an independent laboratory qualified to conduct tests of this type under established standards. The test vehicle had an indicated mileage of 29,256 miles at the beginning of the tests, and its carburetor was adjusted according to manufacturer's specifications before testing. The results of the tests are shown below:

| Test 1 with standard factory equipment—conventional | |
|---|---|
| Carbon Monoxide | 1.15% |
| Hydrocarbons | 239 parts/million |
| Nitrogen Oxides | 1178 parts/million |

| Test 2 with equipment of FIGS. 1 or 8—air only | |
|---|---|
| Carbon Monoxide | 0.79% |
| Hydrocarbons | 215 parts/million |
| Nitrogen Oxides | 1143 parts/million |

| Test 3 with installation of system shown in FIG. 8 | |
|---|---|
| Carbon Monoxide | 0.15% |
| Hydrocarbons | 137 parts/million |
| Nitrogen Oxides | 566 parts/million |

Also, it has been found that nitrogen oxides can be substantially reduced if carbon monoxide is not reduced as much as indicated in the tests above. In addition, the above tests indicated that an increase in gas mileage by more than 1.6 miles per gallon resulted from this test on a conventional automobile without carburetor adjustments. With carburetor adjustment and the above system the increase in gas mileage would be considerably more. These results are by using the FIG. 2 (or FIG. 8) type of unit. A lesser increase in gas mileage was indicated for the FIG. 5 unit. Thus, there is provided a very useful system for assisting in a reduction of exhaust emission pollutants. As pointed out above, it is an important part of the discovery of this invention that supplemental air and vapor-saturated air should be injected or introduced into an engine at points very close to the combustion chamber area but downstream from the carburetion system. This is of even greater importance when utilizing a heated charge of moisture saturated air since any lowering of temperature of such a charge is likely to result in undesirable condensation. Sensitive carburetor settings required by present day engines operate correctly only within a fairly narrow temperature range, and thus, it is necessary to practice the present invention by introducing the preferred supplemental charge of vapor compressed air at a point downstream of the carburetor but as close as practical to the actual combustion zone in the engine. Also, the systems of the present invention maintain a control of exhaust emissions over a longer period of time than does present day equipment.

Although the invention has been described with reference to particular embodiments, it will be appreciated that it can be practiced in other forms and with other designs. The illustrated systems can be secured to a portion of the engine itself or carried within the engine compartment of a motor vehicle. Alternatively, the blower means and vapor injecting means can be included in the original design of an engine so as to be a part of the engine and accessory construction at the time of manufacture. Water or other liquid can be supplied from any suitable source other than the illustrated reservoir system, and preheating of the air can be carried out in a different system, if desired. The unit which is illustrated in FIG. 8 can provide for preheating of the conduit portion 102 in the same manner as discussed for the units shown in FIGS. 2 and 5. Obvious variations and substitutions of equivalent components for what has been described above are intended to be included within the scope of this invention.

What is claimed is:

1. In a system for controlling exhaust emissions from an internal combustion engine by adding a supplemental supply of atmospheric air to an intake manifold associated with the engine, the improvement comprising
   a blower means which can be mounted on or near the engine which is to be controlled, said blower means having (a) an inlet means for receiving air from a source external to the engine and (b) an outlet means for forcing compressed air into the intake manifold of the engine, and said blower means being driven by an electric motor means,
   an electrical heating means associated with the outlet means of said blower means for preheating the compressed air which is supplied to the engine, and control means associated with said heating means for controlling its operation, and
   a one-way valve means located in said outlet means of the blower means to automatically control flow of compressed air to the engine and to prevent a backflow of compressed gases from the engine back into the blower means.

2. The system of claim 1 wherein said outlet means of said blower means includes a conduit means forming a communication between the positive pressure side of the blower means and the intake manifold of the engine, said conduit means containing said heating means and said one-way valve means.

3. The system of claim 2 wherein said conduit means communicates with said intake manifold at a point downstream from a carburetor means associated with a fuel delivery system for said engine.

4. The system of claim 1 wherein said blower means is a variable speed type of blower operatively connected to a throttle linkage associated with the engine so that the blower speed is adjusted in direct relationship with engine speed.

5. The system of claim 1 wherein said heating means is in the form of an electrical resistance heating device.

6. The system of claim 2 wherein said heating means comprises an electrical heating coil contained within a portion of said conduit means for heating compressed air as it passes through the conduit means.

7. The system of claim 1 and including fluid injecting means in combination with the exhaust emission control system.

8. The system of claim 7 wherein said fluid injecting means comprises a device for mixing air and water and for supplying the resulting vapor mixture to the supplemental air charge from said blower means at a point downstream from the positive pressure side of the blower means.

9. In a system for controlling exhaust emissions from an internal combustion engine, the combination comprising
   a blower means for forcing a supplemental supply of compressed air into said engine at a point in a fuel delivery system which is downstream from a carburetor associated with the engine, said blower means being operated by an electrically driven motor means, and
   liquid vapor injecting means for introducing an air and liquid vapor mixture into the fuel delivery system of said engine, said liquid vapor means including a reservoir for liquid and a pumping means for pumping liquid from the reservoir to a zone where the liquid is mixed with air, said blower means and said liquid vapor injecting means both being contained within a single housing which can be easily carried on an internal combustion engine or in an engine compartment for operative connection to a standard fuel delivery system for the engine and said housing being generally divided into upper and lower sections with said reservoir for liquid being in the lower section and substantially separated from the upper section by a splash plate element positioned between the upper and lower sections.

10. The system of claim 9 wherein said pumping means is located in said reservoir and is driven by the same motor means that drives said blower means.

11. The system of claim 10 wherein said motor means is of a variable speed type so that the operations of said blower means and said liquid vapor injecting means can be related to speed of said engine.

12. The system of claim 10, and including a float control means in said reservoir for sensing the level of liquid in said reservoir and for breaking an electrical circuit for said motor means in the event that liquid in said reservoir reaches a predetermined low level.

13. The system of claim 12 wherein said float control means includes a visual indicator arm extending upwardly through said housing so as to be visible from outside of the housing.

14. The system of claim 10 and including a humidistat control means for controlling the operation of said motor means in accordance with preferred humidity conditions for desired engine operation.

15. In a system for controlling exhaust emissions from an internal combustion engine, the combination comprising a blower means for forcing a supplemental supply of compressed air into said engine at a point in a fuel delivery system which is downstream from a carburetor associated with the engine, said blower means being operated by an electrically driven motor means, and liquid vapor injecting means for introducing an air and liquid vapor mixture into the fuel delivery system of said engine, said liquid vapor means including a reservoir for liquid and a pumping means for pumping liquid from the reservoir to a zone where the liquid is mixed with air, said pumping means of said liquid vapor injecting means further comprising a pumping tube which is operatively connected to an impeller portion of said blower means and which extends into said reservoir so that rotation of the impeller will cause the tube to rotate to thereby draw liquid upwardly into the impeller, and including an outlet passageway between said blower means and a vapor mixing zone where said liquid is mixed with compressed air from the blower means.

16. The system of claim 15 and including a plurality of foraminous screens arranged downstream of said mixing zone so that the mixed liquid and air vapor must pass through said screens before being introduced into an intake manifold portion of an internal combustion engine.

17. In a system for controlling exhaust emissions resulting from operation of an internal combustion engine, the combination comprising:

a blower means for forcing a supplemental supply of compressed air into the combustion chamber areas of said engine by introducing said supplemental supply of compressed air into a fuel delivery system at a point which is downstream from a carburetor or other fuel mixing system of the engine, said blower means being operated by a variable speed electrically driven motor means, liquid vapor injecting means for introducing an air and liquid vapor mixture into said fuel delivery system at a point which is also downstream of a carburetor or other fuel mixing system associated with the engine, said liquid vapor means including a reservoir for liquid and a pumping means for pumping liquid from the reservoir to a zone where it is mixed with air prior to introduction into said fuel delivery system.

18. The system of claim 17 wherein said blower means and said liquid vapor injecting means are both contained within a single housing which can be easily carried on an internal combustion engine or in an engine compartment for operative connection to a standard fuel delivery system for the engine.

19. The system of claim 18 wherein said housing is generally divided into upper and lower sections with said reservoir for liquid being in the lower section and substantially separated from the upper section by a splash plate element positioned between the upper and lower sections.

20. The system of claim 17 and including a humidistat control means for controlling the operation of the pumping means associated with the liquid vapor injecting means in accordance with sensed humidity conditions sensed by said humidistat.

* * * * *